United States Patent
Na et al.

(10) Patent No.: US 9,756,261 B2
(45) Date of Patent: Sep. 5, 2017

(54) METHOD FOR SYNTHESIZING IMAGES AND ELECTRONIC DEVICE THEREOF

(71) Applicant: Samsung Electronics Co., Ltd., Suwon-si, Gyeonggi-do (KR)

(72) Inventors: Jin-Hee Na, Seoul (KR); Ki-Huk Lee, Yongin-si (KR); Woo-Yong Lee, Hwaseong-si (KR); Min-Chul Kim, Busan (KR); Young-Kwon Yoon, Seoul (KR); Hye-Jin Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/453,067

(22) Filed: Aug. 6, 2014

(65) Prior Publication Data
US 2015/0062381 A1    Mar. 5, 2015

(30) Foreign Application Priority Data
Sep. 3, 2013  (KR) .......................... 10-2013-0105579

(51) Int. Cl.
| | |
|---|---|
| H04N 5/262 | (2006.01) |
| H04N 5/265 | (2006.01) |
| G06T 11/60 | (2006.01) |
| H04N 5/232 | (2006.01) |
| H04N 5/247 | (2006.01) |

(52) U.S. Cl.
CPC ............. *H04N 5/265* (2013.01); *G06T 11/60* (2013.01); *H04N 5/23293* (2013.01); *H04N 5/247* (2013.01); *H04N 5/2628* (2013.01)

(58) Field of Classification Search
CPC .............................. H04N 5/265; H04N 5/247
See application file for complete search history.

(56) References Cited

U.S. PATENT DOCUMENTS

| | | | | |
|---|---|---|---|---|
| 5,774,591 | A  * | 6/1998 | Black ................ | G06K 9/00315 |
| | | | | 382/118 |
| 2006/0125921 | A1* | 6/2006 | Foote .................... | G06T 3/4038 |
| | | | | 348/159 |
| 2007/0236513 | A1  | 10/2007 | Hedenstroem et al. | |
| 2008/0043041 | A2* | 2/2008 | Hedenstroem et al. ...... | 345/634 |
| 2009/0175492 | A1* | 7/2009 | Chen .................. | G06K 9/00791 |
| | | | | 382/100 |

(Continued)

FOREIGN PATENT DOCUMENTS

| | | |
|---|---|---|
| EP | 1 843 298 A2 | 10/2007 |
| WO | 2013/023706 A1 | 2/2013 |

OTHER PUBLICATIONS

Volker Scholz et al., Garment Motion Capture Using Color-Coded Patterns, Eurographics, Sep. 7, 2005, pp. 439-447, vol. 24, No. 3, The Eurographics Association and Blackwell Publishing.

(Continued)

*Primary Examiner* — Stephen Coleman
(74) *Attorney, Agent, or Firm* — Jefferson IP Law, LLP

(57) ABSTRACT

A method of synthesizing images and an electronic device thereof is provided. The method of synthesizing images includes determining an object region for synthesizing a second image in a first image, determining a warping value of the object region, and synthesizing the second image deformed according to the warping value with the object region.

16 Claims, 23 Drawing Sheets

(56) References Cited

U.S. PATENT DOCUMENTS

2012/0268552 A1 10/2012 Choi et al.
2014/0232743 A1 8/2014 Na et al.

OTHER PUBLICATIONS

Documentation, Aug. 26, 2012 (Aug. 26, 2012), pp. 1-1, XP055226959, Retrieved from the Internet: URL:https://web.archive.org/web/20120826051737/http://www.imagineersystems.com/support/Documentation [retrieved on Nov. 9, 2015].
Tracking Basics, Aug. 23, 2012 (Aug. 23, 2012), pp. 1-8, XP055226949, Retrieved from the Internet: URL:https://web.archive.org/web/20120823063959/http://www.imagineersystems.com/support/Documentation/tracking-basics [Nov. 9, 2015].
Insert Module [mocha Pro], Sep. 20, 2012 (Sep. 20, 2012), pp. 1-6, XP055226953, Retrieved from the Internet: URL:https://web.archive.org/web/20120920235701/http://www.imagineersystems.com/support/Documentation/insert-overview [retrieved on Nov. 9, 2015].

\* cited by examiner

METHOD FOR SYNTHESIZING IMAGES AND ELECTRONIC DEVICE THEREOF

CROSS-REFERENCE TO RELATED APPLICATION(S)

This application claims the benefit under 35 U.S.C. §119(a) of a Korean patent application filed on Sep. 3, 2013 in the Korean Intellectual Property Office and assigned Serial number 10-2013-0105579, the entire disclosure of which is hereby incorporated by reference.

TECHNICAL FIELD

The present disclosure relates to a method for synthesizing images and the electronic device thereof.

BACKGROUND

Cameras for capturing photographs are disposed in most electronic devices, such as recently released smart phones and tablet Personal Computers (PCs). In particular, as functions of the cameras become increasingly important, electronic devices having cameras mounted on front and rear surfaces of the electronic devices are provided.

Typically, a camera disposed on the front surface and a camera disposed on the rear surface of the electronic device, have different uses. For example, the camera disposed on the front surface of the electronic device is used for capturing an image of a user himself or herself, and the camera disposed on the rear surface of the electronic device is used for capturing surrounding objects, landscapes, and/or figures except for the user. Currently, a technology is provided which simultaneously drives the front and rear cameras and simultaneously and uses images obtained from the front and rear cameras. For example, a user of the electronic device may drive both of the front and rear cameras prepared on the electronic device and the electronic device may display two images disposed by using the driven front and rear cameras on one screen. In addition, the electronic device may synthesize the two images obtained by using the front and rear cameras under a user's control and display the synthesized image.

Accordingly, provide a method and apparatus for synthesizing first and second images obtained through first and second cameras disposed at different positions of an electronic device is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages below. Accordingly, an object of the present disclosure is to provide a method and apparatus for synthesizing first and second images obtained through first and second cameras disposed at different positions of an electronic device.

As described above, when the two images are synthesized by using the front and rear cameras, an electronic device synthesizes the images without considering perspective and warping of object and accordingly the images may be unnaturally synthesized.

Another aspect of the present disclosure is to provide a method and apparatus for determining an object region for synthesizing a second image inside a first image in an electronic device.

Another aspect of the present disclosure is to provide a method and apparatus for determining a warping value of an object region for synthesizing images in an electronic device.

Another aspect of the present disclosure is to provide a method and apparatus for synthesizing a second image warped according to a warping value of an object region included in a first image with the object region of the first image in an electronic device.

Another aspect of the present disclosure is to provide a method and apparatus for comparing a shape of an object region selected by a user and a pre-stored object shape table and determining an object region in an electronic device.

Another aspect of the present disclosure is to provide a method and apparatus for, when two or more objects having an identical shape exist in an object region selected by a user in an electronic device, dividing a second image based on the number and size of the objects and performing synthesis.

Another aspect of the present disclosure is to provide a method and apparatus for, when a second image is synthesized with a first image in an electronic device, applying an image effect similar to an image effect existing in the first image to a synthesis region before synthesis.

In accordance with an aspect of the present disclosure, a control method of an electronic device is provided. The control method includes determining an object region for synthesizing a second image in a first image, determining a warping value of the object region, and synthesizing the second image deformed according to the warping value with the object region.

In accordance with another aspect of the present disclosure, an image synthesizing apparatus in an electronic device is provided The image synthesizing apparatus includes one or more processor, a touch sensing display, and at least one camera, wherein the processor obtains at least one of first and second images through the at least one camera, determines an object region for synthesizing the second image in the first image, determines a warping value of the object region, and synthesizes the second image deformed according to the warping value.

In accordance with an aspect of the present disclosure, a non-transitory computer readable medium having a program recorded thereon, when executed, causes at least one processor of an electronic device, to perform a method. The method includes determining an aspect region for synthesizing a second image in the first image, determining a warping value of the aspect region, and synthesizing, with the aspect region, the second image deformed according to the warping value.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
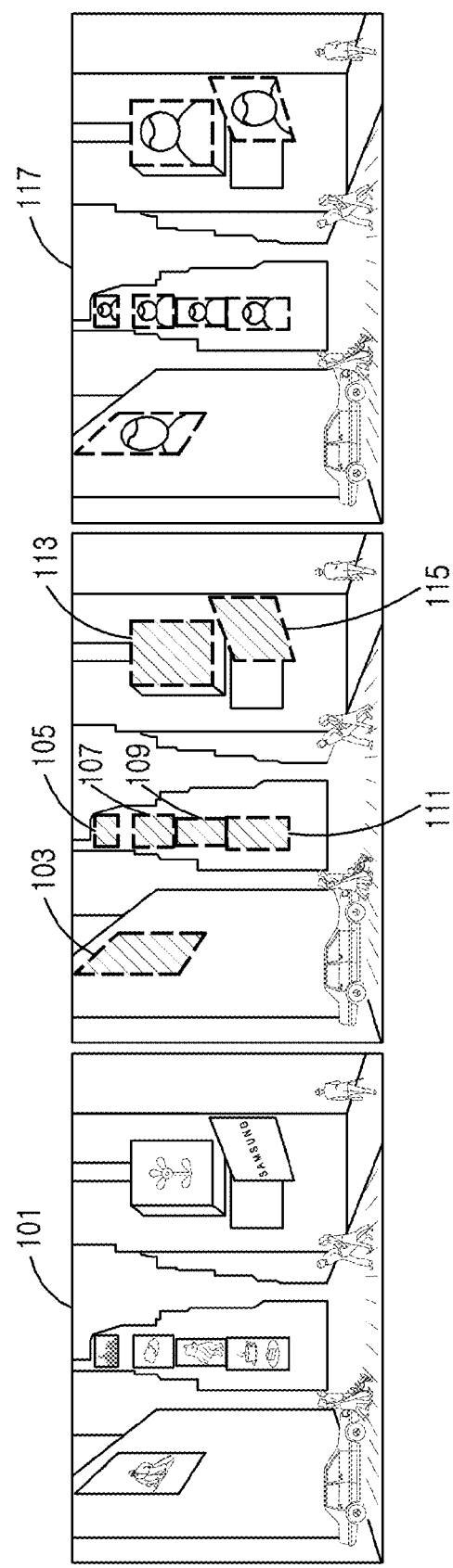
FIG. 1 illustrates an example that an image is deformed and synthesized based on a warping value of an object region, which is for image synthesis in an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The description below, an electronic device may be a device in which two or more cameras are disposed including, for example, a smart phone, a tablet Personal Computer (PC), a mobile phone, a video phone, a Personal Digital Assistant (PDA), a digital camera, an MP3 player, a navigation device, a laptop, a netbook, a computer, or a television, but not limited thereto.

Hereinafter, for convenience of explanation, it is assumed that two cameras are disposed in an electronic device, and the two cameras are respectively disposed on the front and rear surfaces of the electronic device. However, various embodiments of the present disclosure described below may be applied in an identical scheme even when two cameras are disposed on different surfaces or on an identical surface. Alternatively, it may also be applied to a case where two cameras are disposed on different devices. For example, images captured with difference terminals may be synthesized in real time (for example, a video call). As an example of real-time synthesis, an image from a front camera is matched with an image from a rear camera at a frame of an identical time point, and a synthesized image is generated from the matched image frame and displayed on a screen. For another example, it may be applied to a case where cameras disposed in a wearable device (for example, glasses) and a mobile device is used. In addition, a case where two or more cameras or two or less cameras are disposed in an electronic device is also possible (a case where cameras are not disposed is also included). Images to be synthesized may be obtained through cameras disposed in an electronic device, or by other methods (for example, received from another electronic device) other than the cameras.

FIG. 1 illustrates an example that an image is deformed and synthesized according to a warping value of an object region, which is for image synthesis in an electronic device according to an embodiment of the present disclosure.

Referring to FIG. 1, an electronic device obtains a first image 101. The first image 101 may be obtained, for example, from a first camera disposed in a rear surface of the electronic device. The electronic device may analyze the first image and determine an object region (for example, 103, 105, 107, 109, 111, 113 and 115 in FIG. 1) with which a second image is synthesized in the first image. A second image may be obtained, for example, from a second camera disposed in a front surface of the electronic device. The electronic device may synthesize the second image with a determined object region and obtain a synthesized image 117.

According to various embodiments of the present disclosure, the electronic device may determine a warping value that represents a degree of warping of an object region, deform the second image according to the determined warping value, and synthesize the deformed second image with the determined object region. In such a way, the electronic device according to an embodiment of the present disclosure may synthesize the second image with a specific region of the first image in consideration of warping of the object region of the first image, and accordingly minimize a sense of differences between the first and second images. The warping value representing the warping of the object region may represent various types of deformation characteristics. For example, a warping value may include at least one parameter of perspective, scaling, rotation, or affine characteristics of an image. The affine characteristics mean characteristics derivable from affine geometry. In detail, it means that two images having an identical size and shape, and identical parallel variables are not varied by the rest of elements except a distance and angle between the two images, and an area of the two images. Description about various embodiments will be exemplarily provided about an angle among deformation characteristics.

In addition, for real time synthesis, the first and second images generated at the same time are matched with each other and a warping value necessary for synthesis is extracted from the matched first image, the warping value is applied to at least a portion of the second image to generate an image synthesized with the first image. Furthermore, next frame images obtained at the same time through the first and second cameras are respectively designated as first and second images and the synthesized image is reconfigured as a synthesized image for the next frame in real time. For example, the electronic device may reconfigure the synthesized image in real time by consecutively obtaining the first and second images in real time, analyzing the obtained first and second images in real time, determining a warping value for an object region in the first image, applying the determined warping value to the second image that is obtained at the same time as the first image, and then synthesizing the first and second images.

Figure 2:
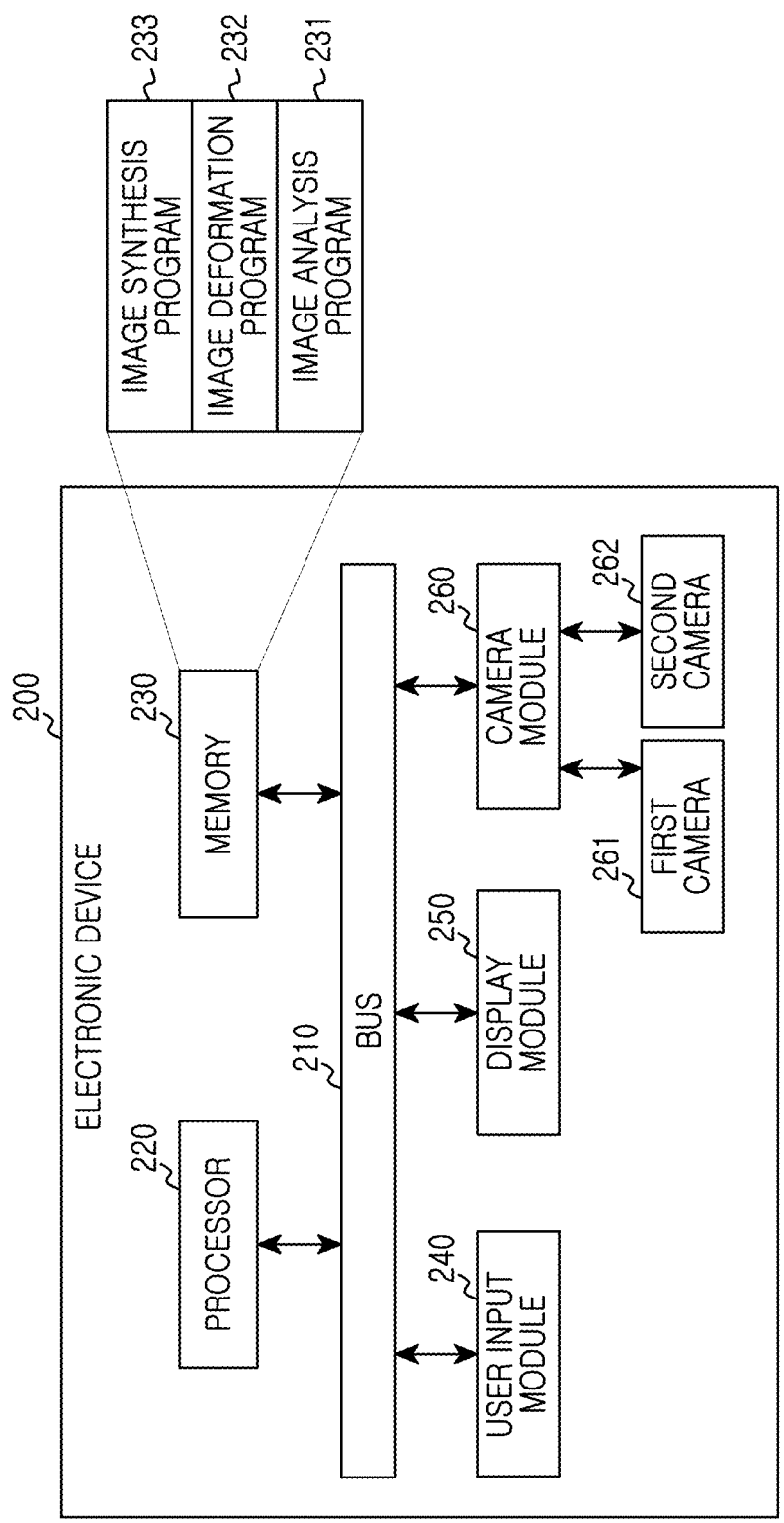
FIG. 2 illustrates a block configuration of an electronic device that synthesizes first and second images based on a warping value of an object according to an embodiment of the present disclosure.

FIG. 2 illustrates a block configuration of an electronic device that synthesizes first and second images according to a warping value of an object according to an embodiment of the present disclosure.

Referring to FIG. 2, the electronic device 200 includes a bus 210, a processor 220, a memory 230, a user input module 240, a display module 250, and a camera module 260, but is not limited thereto. Here, at least one of the processor 220 and the memory 230 may be in plurality.

The bus 210 connects elements included in the electronic device 200 to each other and controls communication between the elements included in the electronic device 200.

The processor 220 controls the electronic device 200 such that the electronic device 200 provides various services. For example, the processor 220 may interpret commands received from one or more other elements (for example, the memory 230, the user input module 240, the display module 250, the camera module 260 included in the electronic device 200 through the bus 210, and execute operations or data processing according to the interpreted commands.

The processor 220 executes one or more programs stored in the memory 230 and controls the electronic device 200 such that the electronic device 200 provides various services. The processor 220 according to an embodiment of the present disclosure may control an image analysis program 231, detect an object region in the first image, and determine the warping value of the detected object region. In addition, the processor 220 may control the image deformation program 232 and deform the second image based on the warping value determined by the image analysis program 231. Furthermore, the processor 220 may control an image synthesis program 233 and synthesize the deformed second image with the detected object region in the first image.

The memory 230 stores commands or data received from or generated by the one or more elements (the processor 220, the user input module 240, the display module 250, the camera module 260) included in the electronic device 200. For example, the memory 230 may store output characteristics of peripheral devices connectable to the electronic device 200 and application program information recognized as a virtual device.

The memory 230 may store one or more programs for services of the electronic device 200. For example, the memory 230 may include one or more of the image analysis program 231, the image deformation program 232 and the image synthesis program 233.

The image analysis program 231 may determine at least one object region for image synthesis in the first image obtained through the first camera 261, and include at least one software element for determining a warping value of the determined object region. For example, the image analysis program 231 may analyze a first image obtained through the first camera 261 disposed in the front surface of the electronic device 200, determine an object region for synthesizing a second image in the first image, and determine the warping value which may represent how much the object region (or object) is warped in contrast to a front side.

First, the image analysis program 231 may detect an object region existing in the first image when a user input is received or the first image is obtained. For example, when a user input for detecting an object region is received after the first image is obtained from the first camera 261, the image analysis program 231 may detect at least one detectable object region in the first image. For another example, when the first image is obtained through the first camera 261, the image analysis program 231 may detect at least one detectable object region in the first image. For another example, when a user input for detecting an object region is received after the first image is obtained from the first camera 261, the image analysis program 231 may detect an object region of a rectangular shape in the first image. For another example, when the first image is obtained through the first camera 261, the image analysis program 231 may detect an object region of a rectangular shape in the first image. As another example, when a specific region is selected by a user input in the first image after the first image is obtained through the first camera 261, the image analysis program 231 may detect at least one object region within a threshold distance or a threshold range from the selected specific region. The image analysis program 231 may analyze a shape of the object existing within the threshold distance or the threshold range from the specific region selected by the user, and may determine whether a corresponding object region is detected based on whether an object shape matching with or similar to the analyzed object shape exists in a pre-stored object shape database. For example, when the object shape matching with or similar to the analyzed object shape does not exist in the pre-stored object shape database, the image analysis program 231 neglects and does not detect the corresponding object region. When the object shape matching with or similar to the analyzed object shape exists in the pre-stored object shape database, the image analysis program 231 may detect the corresponding object region. When shapes of two comparison target objects match within a preset error range, the image analysis program 231 may determine that the two object shapes are similar. In particular, when images are input in real time or a video is captured through the first camera 261, the image analysis program 231 may detect and trace an object region in real time in the images obtained in real time.

When an object region is detected in the first image, the image analysis program 231 may be determined a warping value which represents a degree of warping of the object region. For example, when the first image is captured, the image analysis program 231 may determine the warping value based on at least one of angle and distance information between the object region (or an object in the object region) and the electronic device 200, size information about and affine characteristics of the object region. The image analysis program 231 may determine angle information for an object region (or object) in the obtained first image by including a module capable of calculating an angle between a camera capturing an image and an object region (or object) inside the captured image. As an example of a method of calculating the warping value, a homography transformation function may be used. The homography transformation function is a function representing a transformation relation between shapes of two rectangles when the two rectangles having at least four vertexes are given. By using this transformation function, an image inside the rectangular region, which is not warped in the front image, may be mapped onto a warped rectangular region in the rear image. The warping value of the rectangular region may be extracted from the transformation result.

The image analysis program 231 may shape-analyze an unwarped image and a warped image among at least two obtained images, obtain angle information between the electronic device 200 and an object, and determine the warping value of the object region based on the obtained angle information between the electronic device 200 and the object. For example, image analysis program 231 may shape-analyze an image (an unwarped image) obtained through the camera 262 disposed in the front surface of the electronic device 200 and an image (a warped image) obtained through the camera 261 disposed in the rear surface through homography, obtain angle information between the electronic device 200 and an object, and determine a warping value of an object region based on the angle information between the electronic device 200 and the object. When a plurality of object regions are detected in the first image, the image analysis program 231 may determine a warping value of each of the object regions based on angle and distance information between the electronic device 200 and each object, and each size of the plurality of object regions. When images are input in real time or a video is captured through the first camera 261, the image analysis program 231 may update warping values based on object regions detected in the images input in real time.

The image deformation program 232 may include at least one software element for deforming the second image obtained through the second camera 262 based on the warping value determined through the image analysis program 231. In detail, the image deformation program 231 may deform the second image by allowing the warping to be represented without a sense of difference in a synthesized image during synthesizing images. For example, the image deformation program 232 may deform the second image such that a region positioned relatively distant in one object region is represented to be small and a region positioned relatively close is represented to be large. For another example, the image deformation program 232 may deform the second image such that the second image is represented as being rotated right in an object region which is in a state of being rotated right within one image and the second image is represented as being rotated left in an object region which is in a state of being rotated left within one image.

The image synthesis program 233 may include at least one software element for synthesizing the deformed second image with the object region detected in the first image. In detail, the image synthesis program 233 may synthesize the second image deformed by the image deformation program 232 with the object region detected by the image analysis program 231. When an object region with which the second image is possibly synthesized exists in plurality in the first image, the image synthesis program 233 may synthesize the second image with at least one object region selected by a user or a preset scheme from among the plurality of object regions. In addition, when an object region with which the second image is possibly synthesized exists in plurality in the first image, the image synthesis program 233 may synthesize the second image with all the object regions.

The user input module 240 transmits commands or data generated by the user selection to the processor 220 through the bus 210. For example, the user input module 240 may include one or more of a key pad including at least one hardware button, and a touch panel capable of detecting touch information.

The display module 250 displays a picture, an image or data to a user. The display module 250 may display a synthesis image obtained by synthesizing the first and second images.

The camera module 260 obtains images through data input from the first and second cameras 261 and 262 and delivers the images to the processor 220.

The first and second cameras 261 and 262 may capture images of a specific object according to a user's control. The first and second cameras 261 and 262 may be cameras disposed at different positions and may be driven simultaneously or at different times. For example, the first camera 261 may be positioned in the rear surface and the second camera 200 may be positioned in the front surface. Although FIG. 2 illustrates the first and second cameras, the electronic device 200 according to various embodiment of the present disclosure may include the various numbers of cameras or may not include the camera.

Referring to FIG. 2, the processor 220 of the electronic device 200 is described to perform the image synthesizing function based on a scheme that the processor 220 executes programs 231, 232, and 233 stored in the memory 230. However, as shown in FIG. 3 as another embodiment, the processor 220 of the electronic device 200 may directly perform the image synthesizing function.

Figure 3:
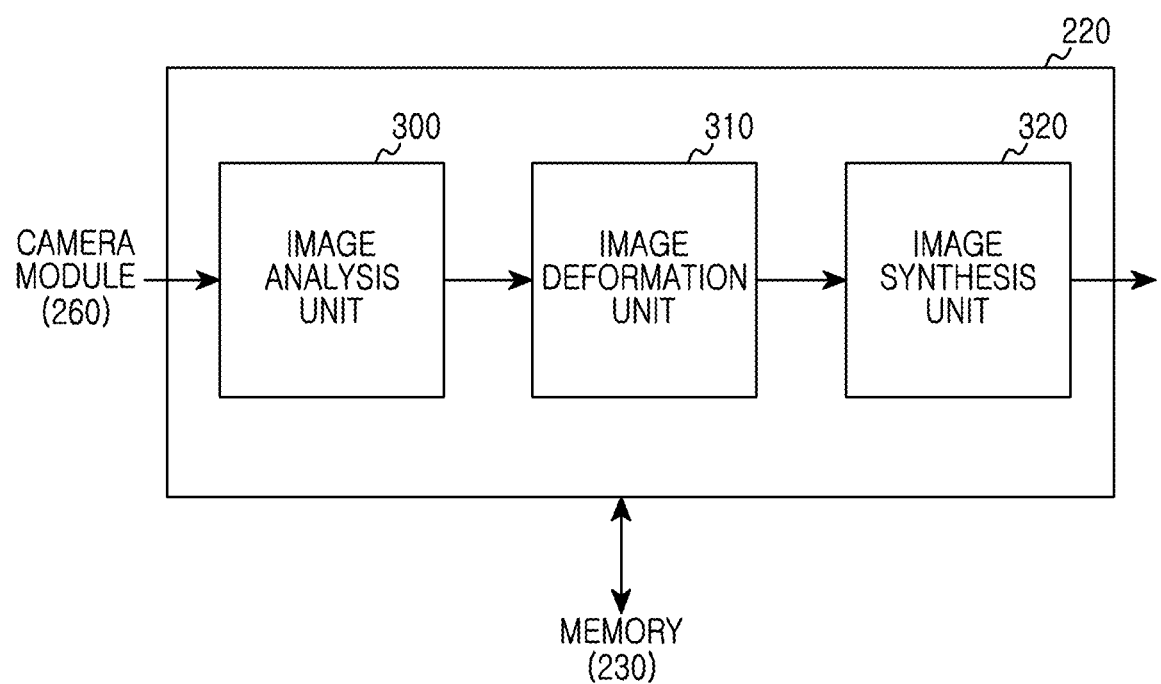
FIG. 3 illustrates a processor of an electronic device that synthesizes first and second images based on a warping value of an object according to an embodiment of the present disclosure.

FIG. 3 illustrates a processor of an electronic device, which synthesizes first and second images according to a warping value of an object according to an embodiment of the present disclosure.

Referring to FIG. 3, the processor 220 may include an image analysis unit 300, an image deformation unit 310, and an image synthesis unit 320.

The image analysis unit 300 may include at least one software element for determining an object region in an obtained first image and determining a warping value of the corresponding object region. For example, the image analysis unit 300 may analyze the first image obtained through the first camera 261 disposed in the front surface of the electronic device 200, determine an object region for synthesizing the first image and a second image, and determine the warping value which may represent how much the object region is warped in contrast to a front side.

First, the image analysis unit 300 may detect an object region existing in the first image when a user input is received or the first image is obtained. For example, when a user input for detecting an object region is received after the first image is obtained from the first camera 261, the image analysis unit 300 may detect all detectable object regions in the first image. For another example, when the first image is obtained through the first camera 261, the image analysis unit 300 may automatically detect one or more object regions satisfying preset conditions in the first image without a user input. For another example, when a user input for detecting an object region is received after the first image is obtained from the first camera 261, the image analysis unit 300 may detect all object regions of a rectangular shape in the first image. For another example, when the first image is obtained through the first camera 261, the image analysis unit 300 may detect all object regions of the rectangular shape in the first image. For another example, when a specific region is selected by a user input in the first image after the first image is obtained through the first camera 261, the image analysis program 231 may detect detectable object regions within a threshold distance from the selected specific region. When an object of a specific shape exists in the specific region selected by the user, the image analysis unit 300 may detect an object region according to whether an object shape similar to the corresponding object shape exists in a pre-stored object shape database. In particular, when a video is captured through the first camera 261, the image analysis unit 300 may detect the object region in real time by using obtained images.

When an object region is detected in the first image, the image analysis program 231 may determine a warping value which represents a degree of warping of the object region. For example, when the first image is captured, the image analysis program 231 may determine the warping value based on at least one of angle and distance information between the object region (or an object in the object region) and the electronic device 200, size information about and affine characteristics of the object region in the first image. When including a module capable of calculating an angle between a camera capturing an image and a captured object, the image analysis unit 300 may analyze the obtained first image and determine the angle information. When including a sensor capable of calculating an angle between the camera and the object during capturing of the image, the image analysis unit 300 may determine the angle information by using the sensor. When a plurality of object regions are detected in the first image, the image analysis unit 300 may determine warping values for some or all of the plurality of object regions based on at least one of angle and distance information between the electronic device 200 and each object, size information about and affine characteristics of each object. In particular, when a video is captured through the first camera 261, the image analysis unit 300 may update the warping values based on the object regions detected in real time.

The image deformation unit 310 may include at least one software element for deforming the obtained second image based on the warping value determined by the image analysis unit 300. For example, the image deformation unit 310 may deform the second image obtained through the second camera 262 disposed in the rear surface of the electronic device 100 based on the warping value determined by the image analysis unit 300. The image deformation unit 310 may deform the second image such that, during synthesizing images, perspective and warping are represented without a sense of difference in the synthesized image. For example, the image deformation unit 310 may deform the second image such that a region positioned relatively distant in one object region is represented to be small and a region positioned relatively close is represented to be large.

The image synthesis unit 320 may include at least one software element for synthesizing the deformed second image with the object region detected in the first image. In detail, the image synthesis unit 320 may synthesize the second image deformed by the image deformation unit 310 with the object region detected by the image analysis unit 300. When the synthesizable object region exists in plurality, the image synthesis unit 320 synthesizes the second image with an object region selected by a user, with all the object regions, or with an arbitrary object region.

Figure 4A:
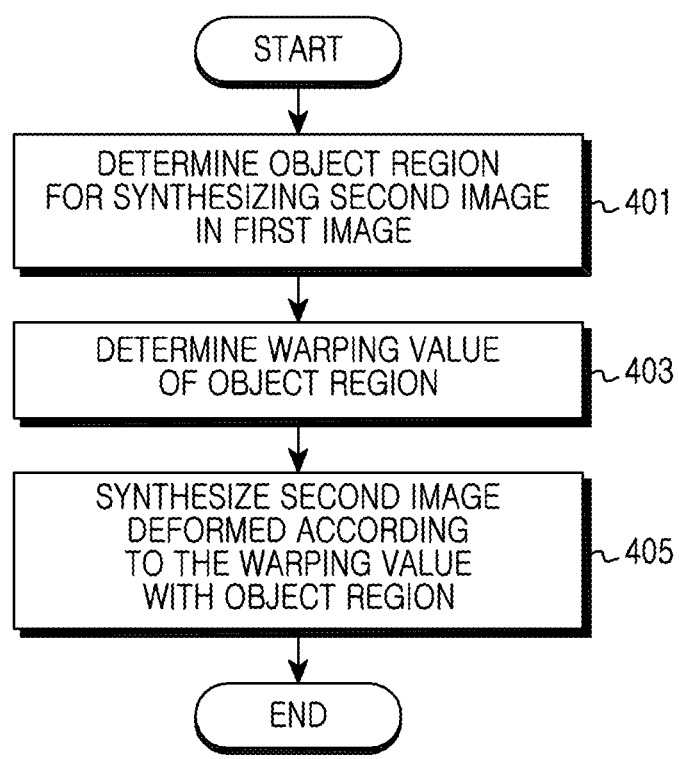
FIG. 4A illustrates a procedure of synthesizing first and second images based on a warping value of an object region, which is determined by an electronic device according to an embodiment of the present disclosure.

FIG. 4A illustrates a procedure of synthesizing first and second images based on a warping value of an object region determined by the electronic device according to an embodiment of the present disclosure.

Referring to FIG. 4A, the electronic device 200 obtains first and second images in operation 401. For example, the electronic device 200 may obtain the first and second images through first and second cameras disposed at different positions of the electronic device 200. For example, the first camera may be disposed in the rear surface of the electronic device 200, and the second camera may be disposed in the front surface of the electronic device 200.

The electronic device 200 may determine an object region for synthesizing the second image in the obtained first image in operation 403. For example, when obtaining the first image, the electronic device 200 may determine at least one detectable object region in the first image as the object region for synthesizing the second image. For another example, the electronic device 200 may determine at least one object region positioned within a threshold distance or a threshold range from a region selected by a user input in the first image as the object region for synthesizing the second image.

The electronic device 200 may determine a warping value of the determined object region in operation 405. In other words, the electronic device 200 may determine the warping value representing how much the detected object is warped in contrast to a front side. The electronic device 200 may determine the warping value based on at least one of angle and distance information between the detected object region and the electronic device 200, size information about and affine characteristics of the object region (or detected object). In addition, when the detected object region is in plurality, the electronic device 200 may determine the warping value for each of the object regions. Furthermore, when there is a predetermined level of a difference in shape (for example, an aspect ratio) between the detected object region and the second image, the electronic device 200 may adjust (for example, crop) a shape of the second image so that at least a portion of the second image matches with the shape of the detected object region.

Then, the electronic device 200 may synthesize the deformed second image with the object region according to the determined warping value. For example, the electronic device 200 may synthesize the deformed second image with the detected object region of the first image based on the warping value. Accordingly, the electronic device 200 may provide the synthesized image without a sense of difference to the user.

Figure 4B:
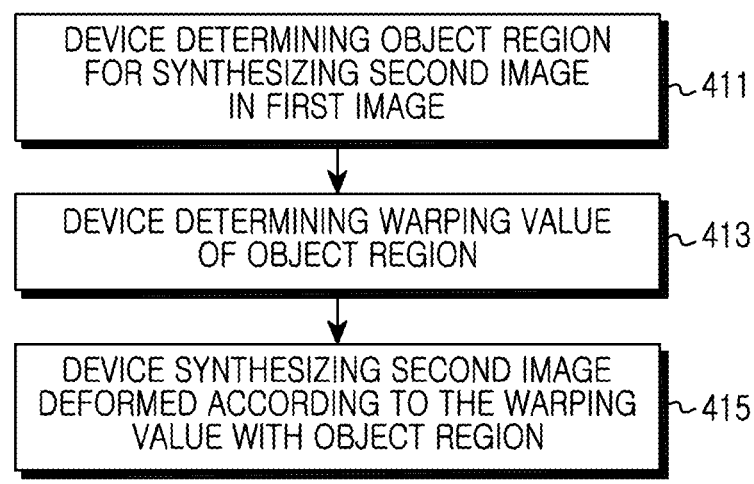
FIG. 4B illustrates a device synthesizing first and second images based on a warping value of an object region, which is determined by an electronic device according to an embodiment of the present disclosure.

FIG. 4B illustrates a device synthesizing the first and second images based on the warping value of the object region determined by the electronic device according to an embodiment of the present disclosure.

Referring to FIG. 4B, the electronic device 200 may include a device 411 determining an object region for synthesizing the second image in the first image. In addition, the electronic device 200 may include a device extracting feature points of a specific object in an image and a device detecting an object region based on the extracted feature points. Furthermore, the electronic device 200 may include a database (DB) storing information about an object shape and a device comparing an object shape in the image with an object shape in the corresponding DB and detecting a similar object shape.

In addition, the electronic device 200 may include a device 413 determining a warping value of an object region. The electronic device 200 may also include a device calculating at least one of an angle and distance between the electronic device 200 and a capturing target, a size and affine characteristics of the capturing target, when capturing an image.

Moreover, the electronic device may include a device 415 synthesizing the deformed second image with an object region according to the warping value. When capturing a video through the first camera, the electronic device 200 may include a device detecting object regions in real time by using obtained images and a device updating the warping values by using the object regions detected in real time.

Figure 5:
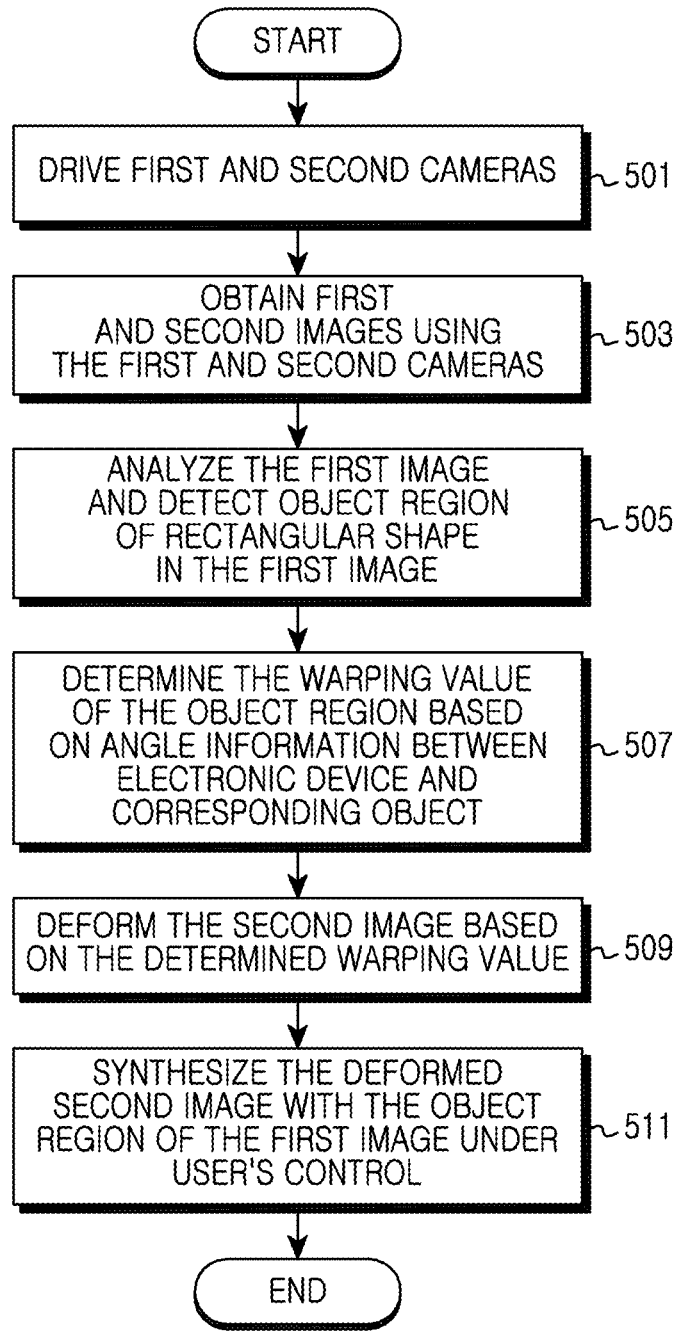
FIG. 5 illustrates a procedure of synthesizing first and second images when a shape of an object region existing in the first image is rectangular in an electronic device according to an embodiment of the present disclosure.

FIG. 5 illustrates a procedure of synthesizing first and second images, when a shape of an object region existing in the first image is rectangular in an electronic device according to an embodiment of the present disclosure.

Referring to FIG. 5, the electronic device 200 may drive the first and second cameras 261 and 262 in operation 501. Here, the first and second cameras 261 and 262 may be disposed at different positions at the electronic device 200. For example, the first camera 261 may be disposed in the rear surface of the electronic device 200 and the second camera 262 may be disposed in the front surface of the electronic device 200.

The electronic device 200 may obtain first and second images using the first and second cameras 261 and 262 in operation 503. Here, the first image means an image obtained through the first camera 261 and the second image means an image obtained through the second camera 262.

The electronic device 200 may analyze the first image and detect an object region of a rectangular shape in the first image in operation 505. Here, the electronic device 200 may extract feature points of an object having a specific shape in the image by using a well-known object detecting technology and detect a region of the object based on the extracted feature points. For example, the electronic device 200 may all detectable object regions having a rectangular shape in the first image. For another example, when a specific region is selected by a user input in the first image, the electronic device 200 may detect a detectable region of an object within a threshold distance from the selected specific region.

The electronic device 200 may determine a warping value of the object region based on angle information between the electronic device 200 and the corresponding object in operation 507. For example, in order to confirm how much the detected object is warped in contrast to a front side, the electronic device 200 may shape-analyze (for example, homography) an image obtained through the camera 262 disposed in the front surface and an image obtained through the camera 261 disposed in the rear surface of the electronic device 200, obtain angle information between the electronic device 200 and the object, and determine the warping value of the object region based on the angle information obtained between the electronic device 200 and the object. In addition, the electronic device 200 may determine the warping value including distance information between the electronic device 200 and the object.

In operation 509, the electronic device 200 may deform the second image based on the determined warping value and then proceed to operation 511 and synthesize the deformed second image with the object region of the first image under user's control. Then the electronic device 200 may terminate the procedure according to an embodiment of the present disclosure.

Figure 6A:
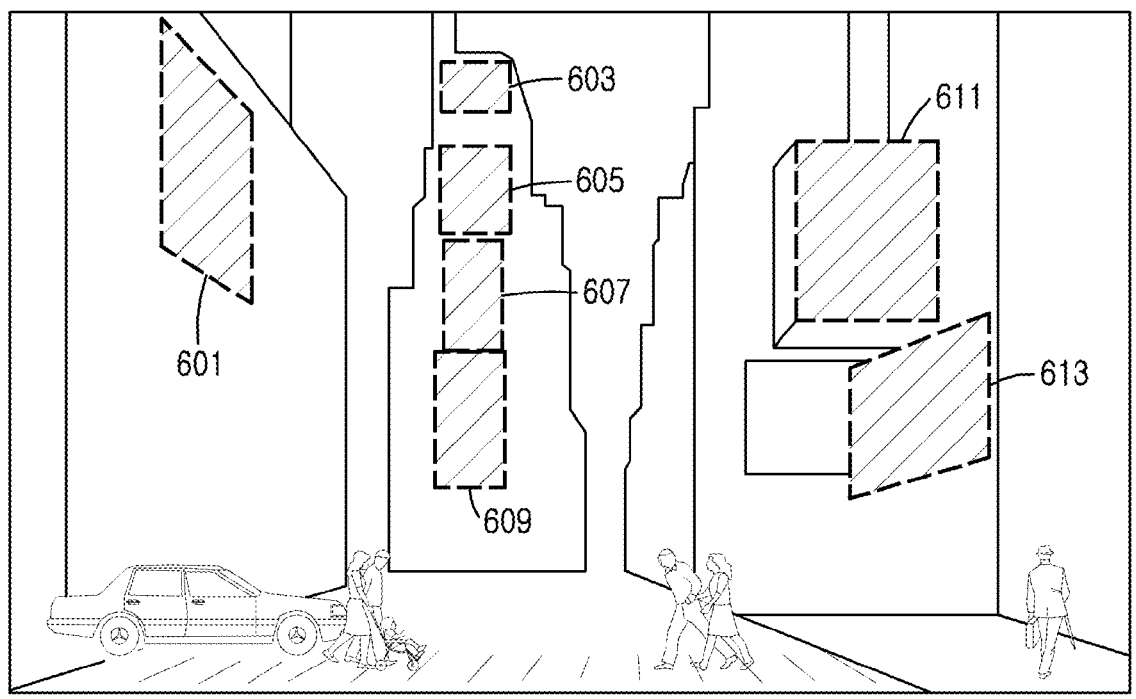
FIGS. 6A, 6B, and 6C illustrate examples where a second image is captured and synthesized with an object region of a rectangular shape existing in a first image in an electronic device according to an embodiment of the present disclosure.
Figure 6B:
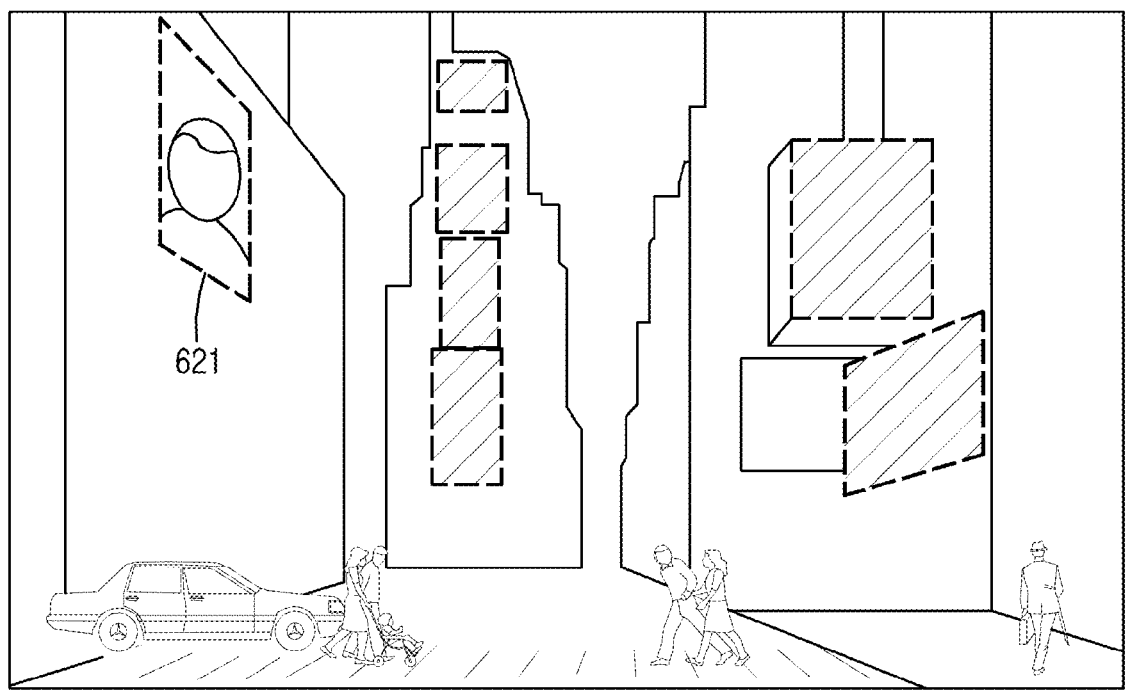
Figure 6C:
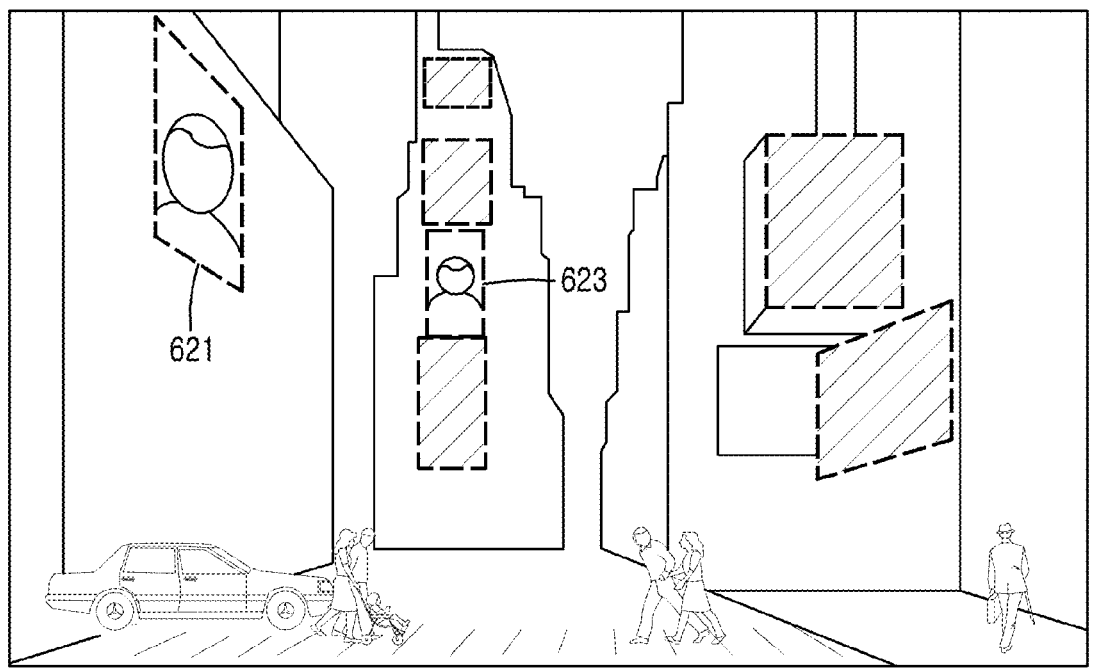

FIGS. 6A to 6C illustrate examples where a second image is captured and synthesized with an object region having a rectangular shape inside the first image in an electronic device according to an embodiment of the present disclosure.

Referring to FIG. 6A, the electronic device 200 may detect all detectable object regions 601, 603, 605, 607, 609, 611 and 613 in the first image. Then, the electronic device 200 may determine a warping value of each of the object regions.

Referring to FIG. 6B, when a specific object region is selected under the user's control, the electronic device 200 may deform the second image based on the warping value for the selected object region and synthesize the deformed second image with the corresponding object region 621. When the first object region is reselected after the image is synthesized with the first object region, the electronic device 200 may update a synthesis image by synthesizing the second image obtained at the time of reselection with the reselected first object region. On the contrary, when a second object region is selected after an image is synthesized with the first object region, the electronic device 200 may maintain the image 621 synthesized with the first object region without a change, as shown in FIG. 6C, and synthesize the second image obtained when the second object region is selected with the second object region 623.

FIGS. 7A to 7D illustrate examples that a second image is synthesized with an object region of a rectangular shape selected by a user in a first image in an electronic device according to an embodiment of the present disclosure.

Figure 7A:
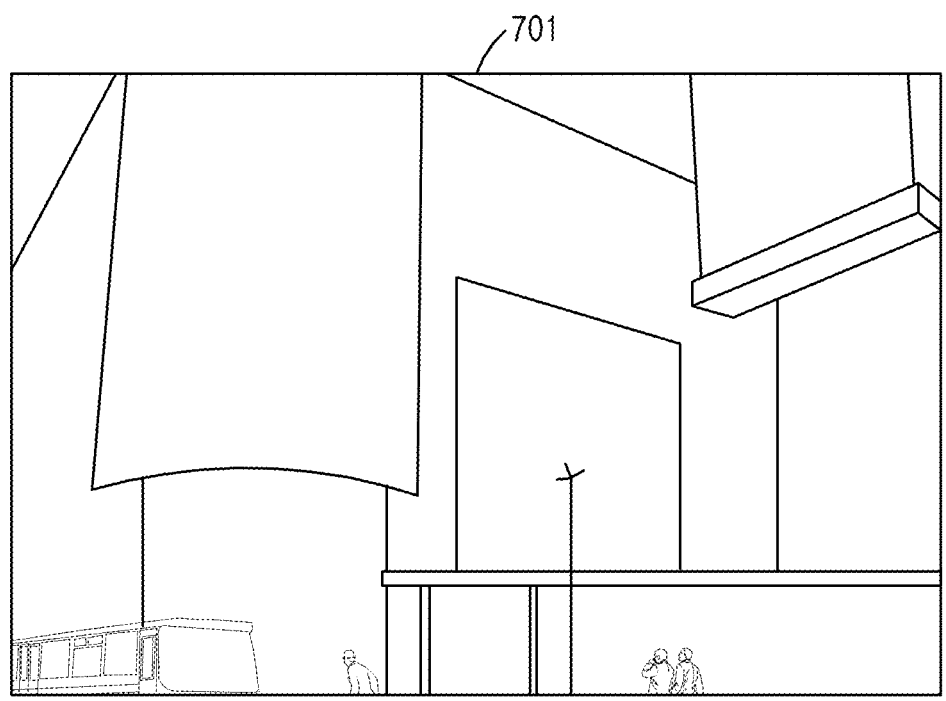
FIGS. 7A, 7B, 7C, and 7D illustrate examples where a second image is synthesized with an object region of a rectangular shape selected by a user in a first image in an electronic device according to an embodiment of the present disclosure.

Referring to FIG. 7A, the electronic device 200 may obtain a first image 701 through the first camera 261.

Figure 7B:
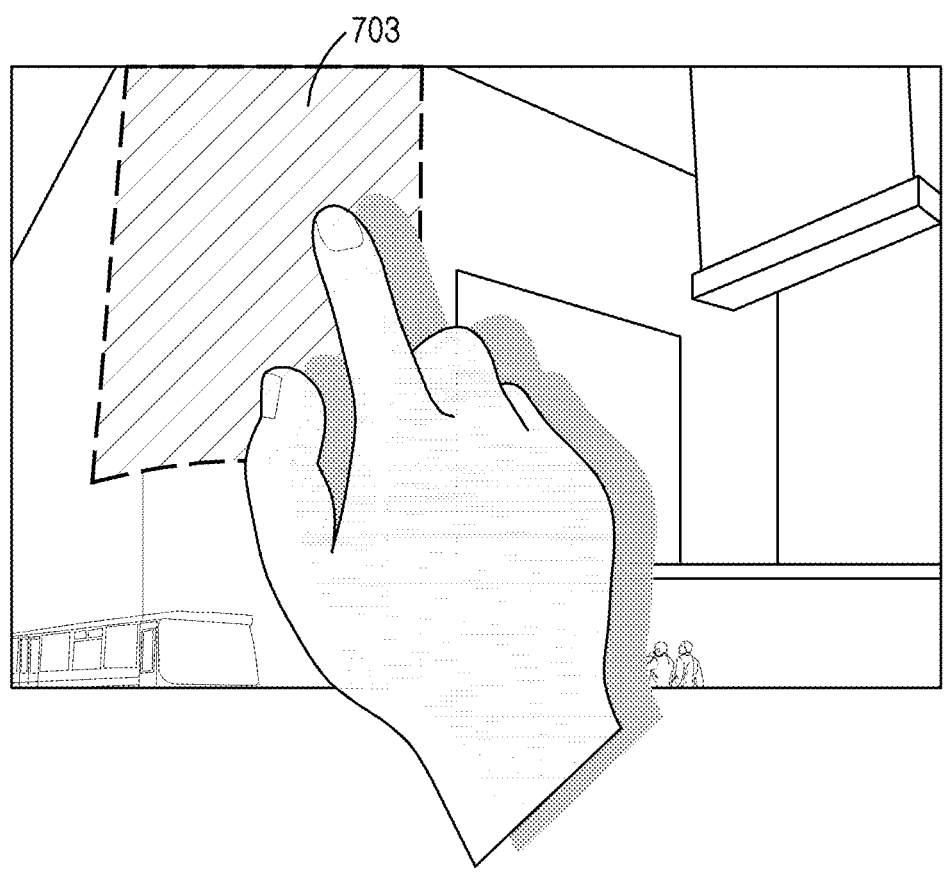

Referring to FIG. 7B, when a specific region 703 is selected according to a user input, the electronic device 200 may detect detectable object regions within a threshold distance from the selected specific region. The electronic device 200 may determine a warping value for the detected object region.

Figure 7C:
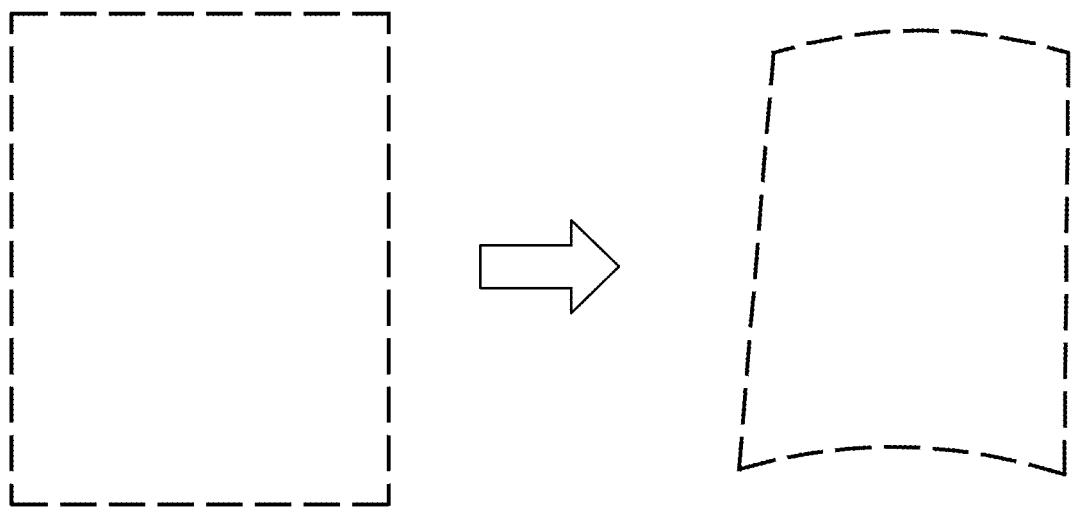

Referring to FIG. 7C, deform the second image based on the determined warping value.

Figure 7D:
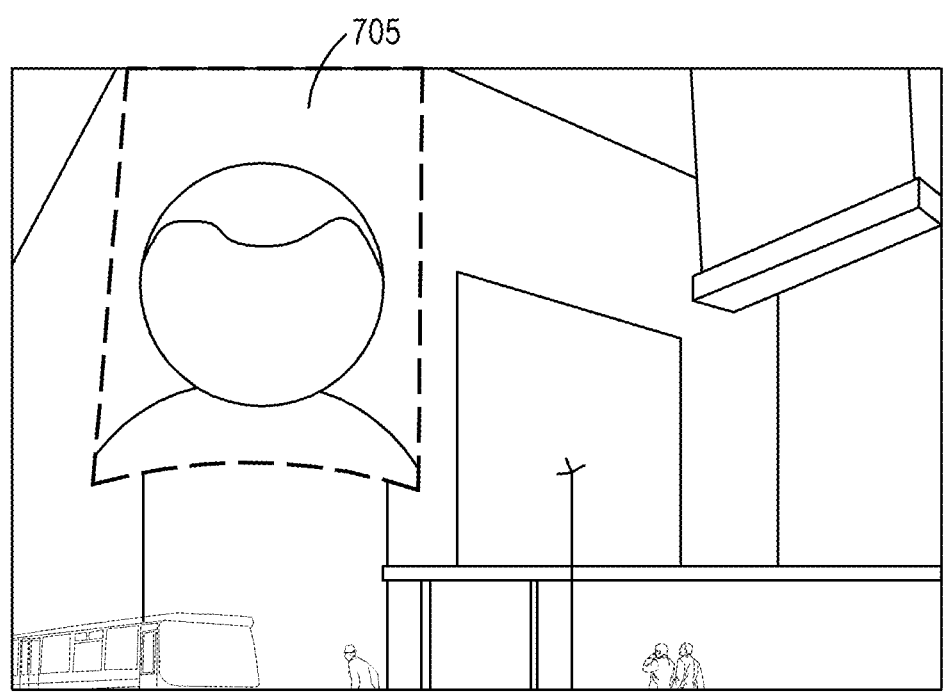

Referring to FIG. 7D, the electronic device 200 may synthesize the deformed second image with the detected object region 705.

Figure 8:
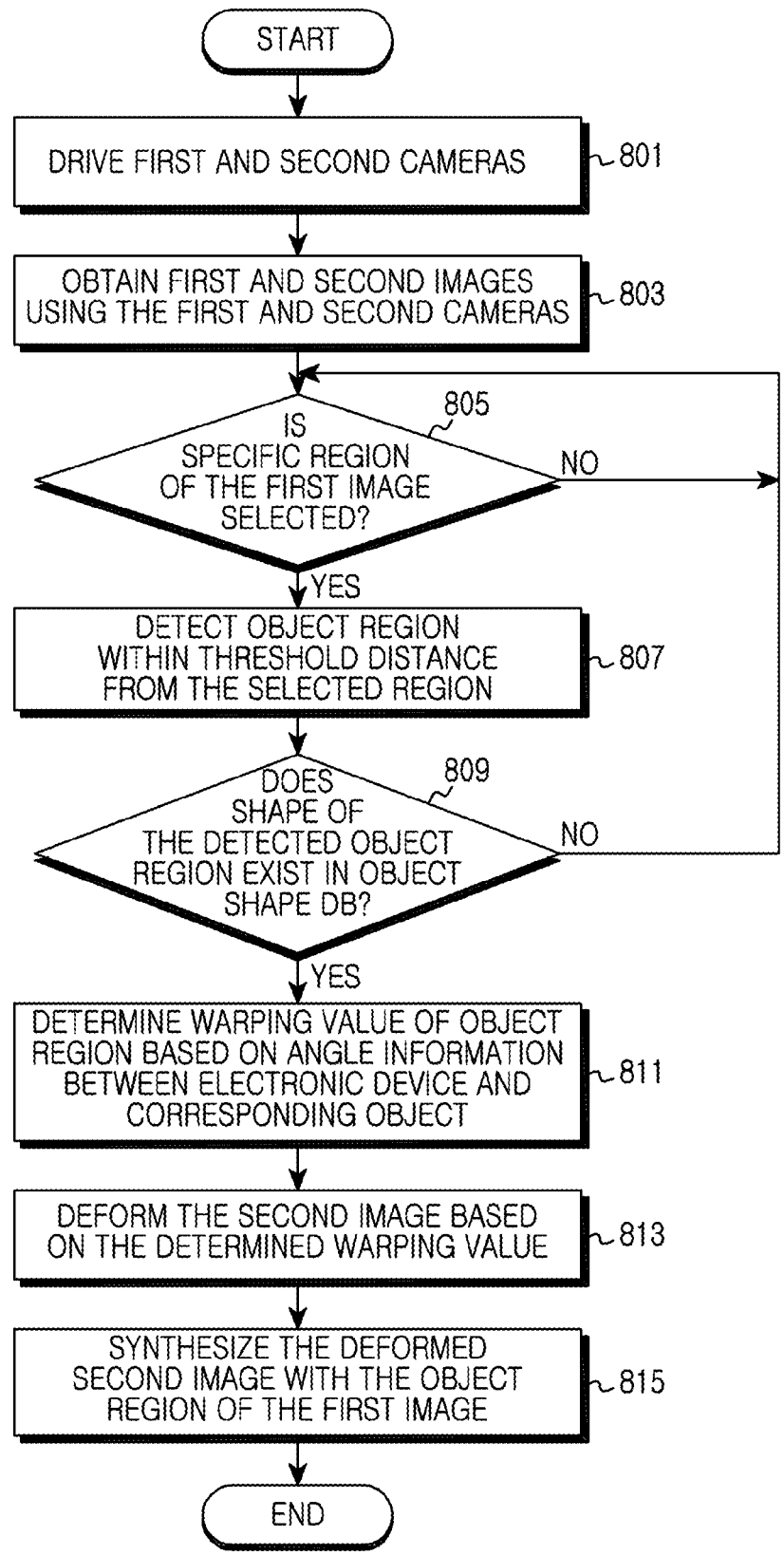
FIG. 8 illustrates a procedure of synthesizing first and second images, when an object shape existing in the first image is not a rectangular in an electronic device according to another embodiment of the present disclosure.

FIG. 8 illustrates a procedure of synthesizing first and second images when a shape of an object region existing in the first image is not rectangular in an electronic device according to another embodiment of the present disclosure.

Referring to FIG. 8, the electronic device 200 may drive the first and second images 261 and 262 in operation 801 and then obtain first and second images using the first and second cameras 261 and 262 in operation 803.

The electronic device 200 confirms whether a specific region of the first image is selected in operation 805. For example, the electronic device 200 may confirm whether a pre-defined input (for example, a tap, a double tap, or a drag) for the specific region is received. For another example, the electronic device 200 may confirm whether a specific region satisfying a preset condition is automatically selected, when obtaining the images.

When the specific region in the first image is selected, the electronic device 200 may detect an object region within a threshold distance from the selected region in operation 807. For example, when the specific region is selected by a user, the electronic device 200 may detect a region of an object positioned around the selected specific region. For another example, the electronic device 200 may automatically detect a region of a specific object which satisfies a preset condition.

When the specific region in the first image is not selected, the electronic device 200 returns to operation 805 and performs again operations thereafter.

After operation 807, the electronic device 200 confirms whether a shape of the detected object region exists in an object shape DB in operation 809. For example, the electronic device 200 may search the pre-stored object shape DB for an object shape similar to the object shape detected in the selected region under the user's control, and detect an object shape based on found results. When a circular object is detected in a region selected by the user's control, the electronic device 200 confirms whether an object shape similar to the circular type exists in the pre-stored object shape DB. When the object shape similar to the circular type exists, the electronic device 200 may detect an object region based on a corresponding shape in the selected region. Here, the object shape DB may be stored in a memory of the electronic device 200 in advance, or in another external device (for example, an external server or another electronic device) except for the electronic device 200. For example, when including a communication unit capable of performing data communication, the electronic device 200 may search the object DB of the other external device through the communication unit.

When the shape of the detected object region exists in the object shape DB, the electronic device 200 may determine a warping value of the object region based on angle information between the camera and the corresponding object in operation 811. In detail, the electronic device 200 may shape-analyze (for example, homography) an image (an unwarped image) obtained through the camera 261 disposed in the front surface and an image (a warped image) obtained through the camera 262 disposed in the rear surface of the electronic device 200, obtain the angle information between the electronic device 200 and the object, and determine the warping value of the object region based on the angle information obtained between the electronic device 200 and the object. In addition, the electronic device 200 may determine the warping value including distance information between the electronic device 200 and the object.

When the shape of the detected object region does not exist in the object shape DB, the electronic device 200 returns to operation 805 and performs again operations thereafter.

After operation 811, the electronic device 200 may deform the second image based on the determined warping value in operation 813, and synthesize the deformed second image with the object region of the first image in operation 815. Then the electronic device 200 may terminate the procedure according to the other embodiment of the present disclosure.

FIGS. 9A to 9D illustrate examples where first and second images are synthesized when a shape of an object region existing in the first image is not rectangular according to an embodiment of the present disclosure.

Figure 9A:
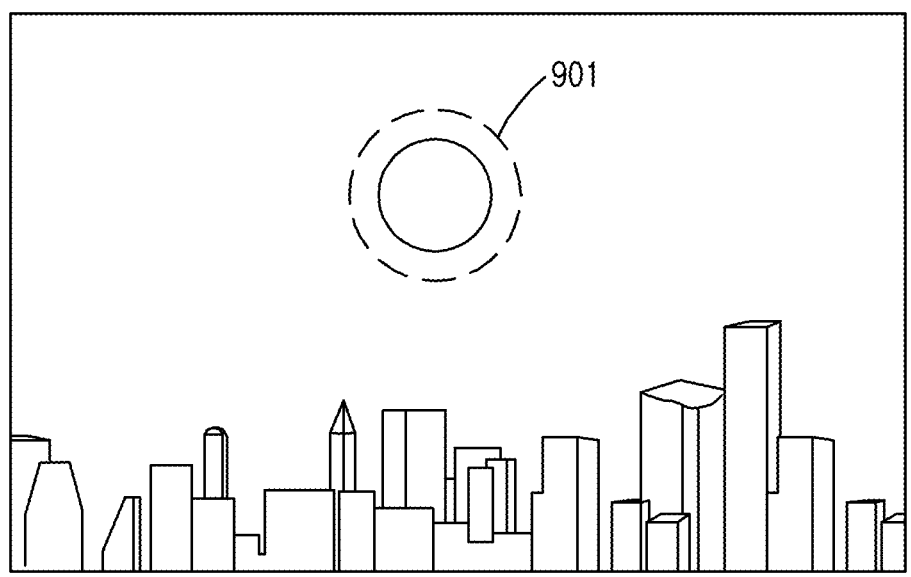
FIGS. 9A, 9B, 9C, and 9D illustrate examples where first and second images are synthesized when an object shape existing in the first image is not rectangular according to another embodiment of the present disclosure.

Referring to FIG. 9A, when a specific region 901 in the first image is selected by a user, the electronic device 200 detects an object region within a threshold distance from the selected region 901. When a shape of the detected object region is circular, the electronic device 200 may confirm whether an object shape similar to the circular type exists in the pre-stored object shape DB. When the object shape similar to the circular type exists in the pre-stored object shape DB, the electronic device 200.

Figure 9B:
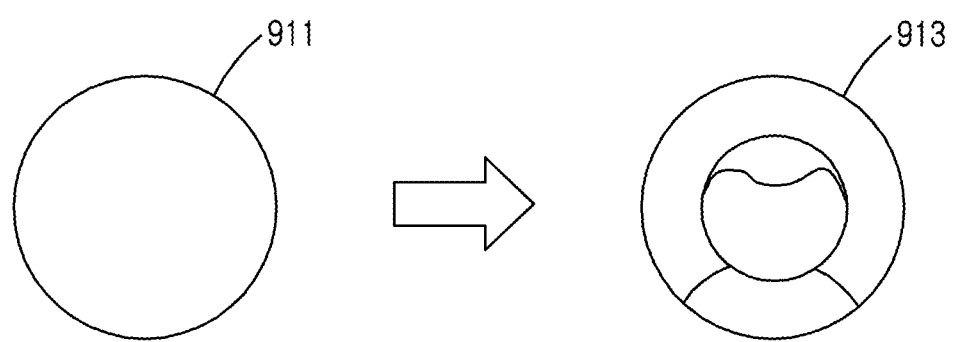

Referring to FIG. 9B, obtain a synthesis image 913 by synthesizing the second image 911 in the object region of the first image. Here, the electronic device 200 may obtain the synthesis image by determining a warping value of the corresponding object region, deforming the second image based on the determined warping value, and synthesizing the deformed second image with the object region of the first image.

Figure 9C:
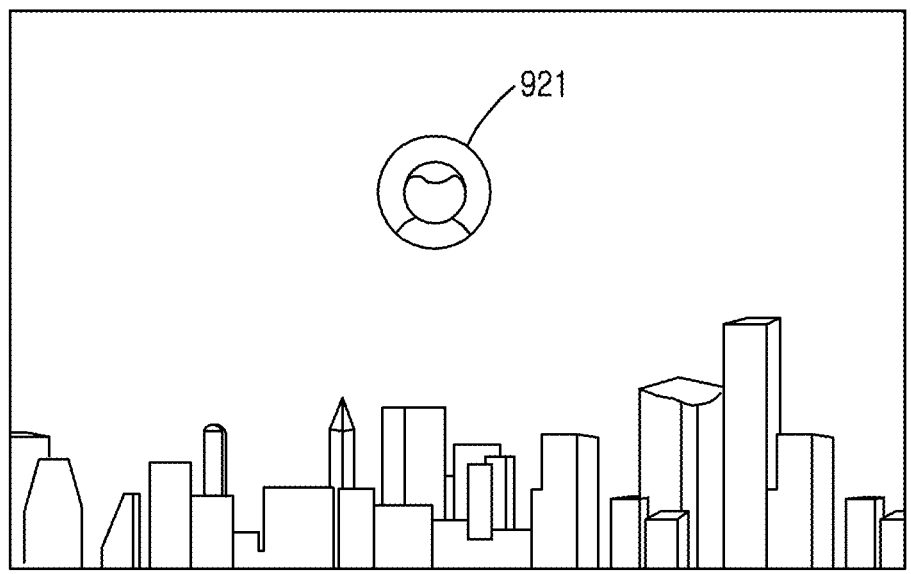

Referring to FIG. 9C, the electronic device 200 may finally obtain the synthesis image 921 by synthesizing the image synthesized based on the object shape DB with the object region of the first image. When a 3-dimensional object shape is stored in the object shape DB, the electronic device 200 may search the object shape DB for the 3-dimensional object shape, determine a warping value of the corresponding object region, and synthesize the image based on the determined warping value.

Figure 9D:
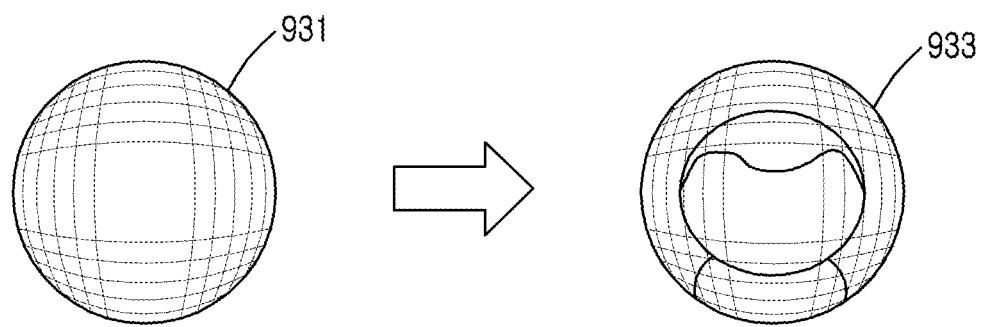

Referring to FIG. 9D, the electronic device 200 may search the object shape DB for a 3-dimensional sphere shape, determine a warping value for a found shape 931 of the 3-dimensional sphere, and synthesize a second image 933 deformed based on the determined warping value with the first image.

Figure 10:
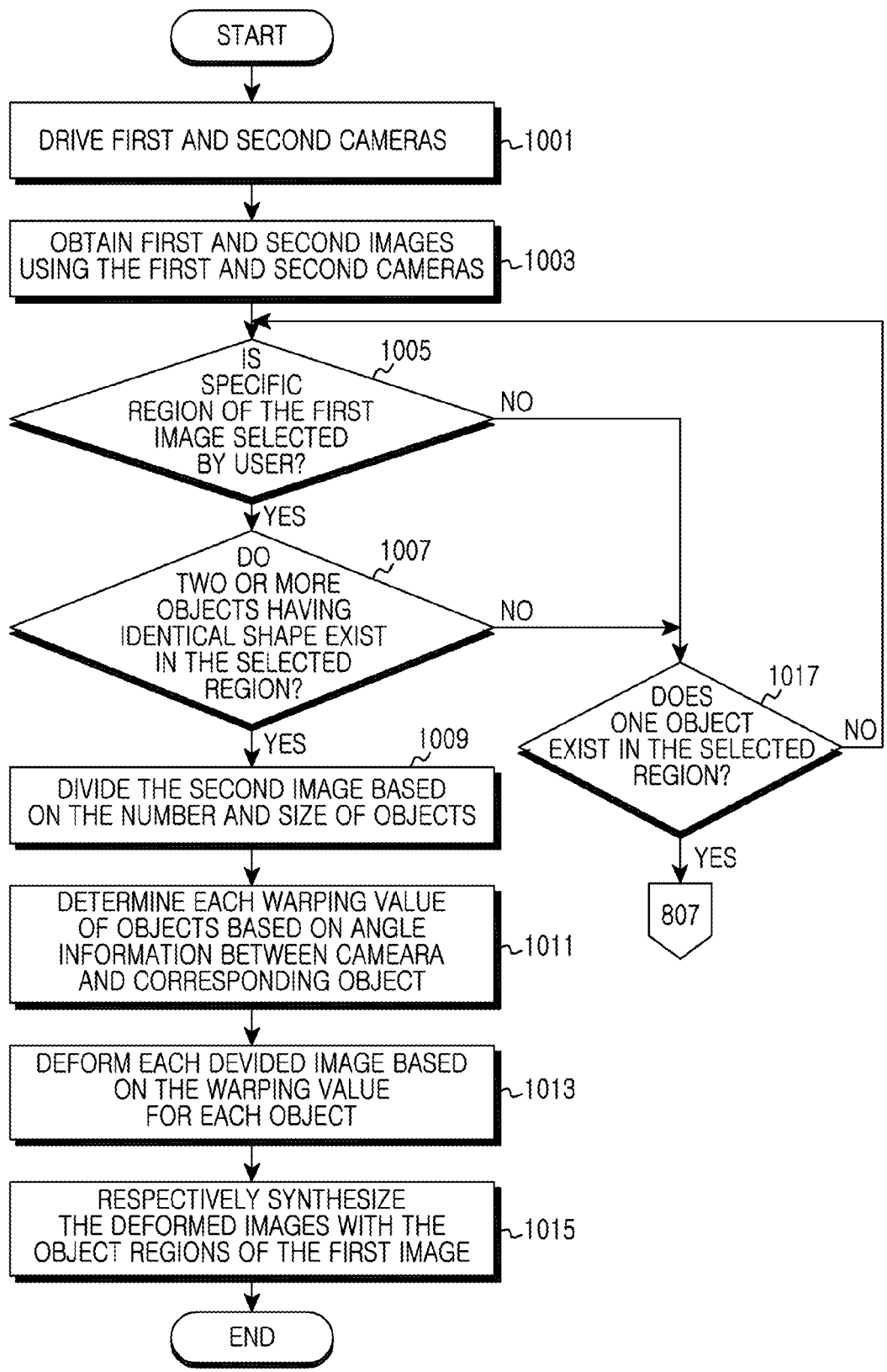
FIG. 10 illustrates a procedure of synthesizing first and second images, when two or more objects having an identical shape in a selected region in an electronic device according to another embodiment of the present disclosure.

FIG. 10 illustrates a procedure of synthesizing first and second images when two or more objects having an identical shape in a selected region in an electronic device according to another embodiment of the present disclosure.

Referring to FIG. 10, after driving the first and second cameras 261 and 262 in operation 1001, the electronic device 200 may obtain first and second image using the first and second cameras 261 and 262 in operation 1003.

The electronic device 200 confirms whether a specific region of the first image is selected by a user in operation 1005. In other words, the electronic device 200 confirms whether a pre-defined input (for example, a tap, a double tap or a drag) is received.

When the specific region of the first image is selected by the user, the electronic device confirms whether two or more objects having an identical shape exist in the selected region in operation 1007. For example, the electronic device 200 confirms objects of an identical shape like windows of an apartment house exist in the region selected by the user in plurality.

On the contrary, when the specific region of the first image is not selected by the user, the electronic device 200 returns to operation 1005 and performs again operations thereafter.

In operation 1007, when two or more objects having an identical shape exist in the selected region, the electronic device 200 may proceed to operation 1009 and divide the second image based on the number and size of the objects.

For example, when four rectangular objects exist in the selected region, the electronic device 200 may divide the second image into 4 images. In particular, the electronic device 200 may divide the second image in size corresponding to each size of object regions.

In operation 1007, when two or more objects having an identical shape do not exist in the selected region, the electronic device 200 may proceed to operation 1017 and confirm whether one object exists in the selected region.

When the one object exists in the selected region, the electronic device 200 performs operations thereafter at operation 807 of FIG. 8.

On the contrary, when the one object does not exist in the selected region, the electronic device 200 returns to operation 1005 and performs again operations thereafter.

After operation 1009, the electronic device 200 may proceed to operation 1011 and determine each warping value of object regions based on each piece of angle information between the camera and corresponding objects. In detail, when capturing images, the electronic device 200 may measure each piece of the angle information between the camera of the electronic device 200 capturing the objects and each of the captured objects, and determine the warping value for each object which represents how much each of the object regions is warped in contrast to the front side.

In operation 1013, the electronic device 200 may deform each divided image based on the warping value for each of the objects, and then synthesize each deformed image with the object region of the first image. Then, the electronic device 200 may terminate the procedure according the other embodiment of the present disclosure.

Figure 11A:
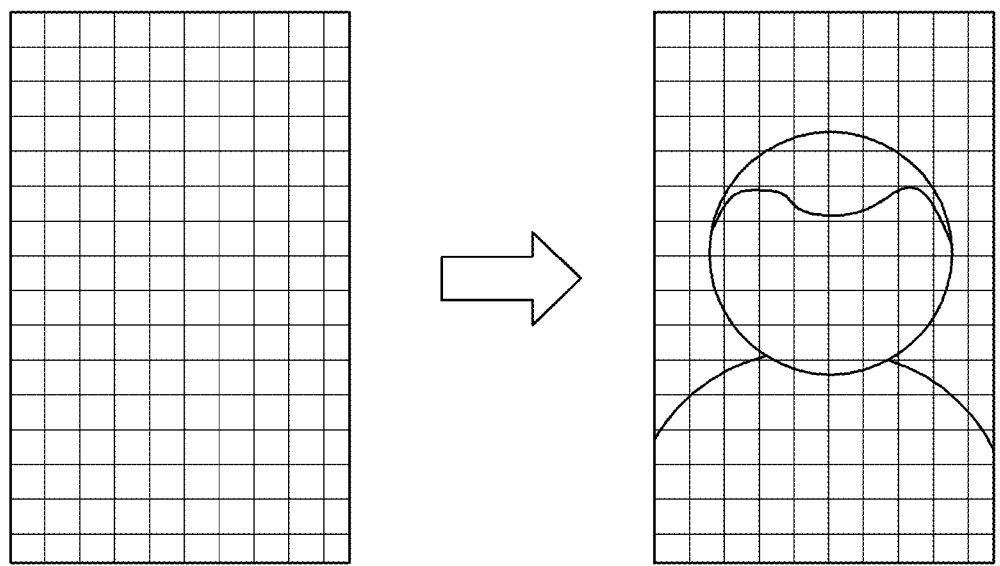
FIGS. 11A and 11B illustrate examples where first and second images are synthesized, when two or more objects having an identical shape in a selected region in an electronic device according to another embodiment of the present disclosure.
Figure 11B:
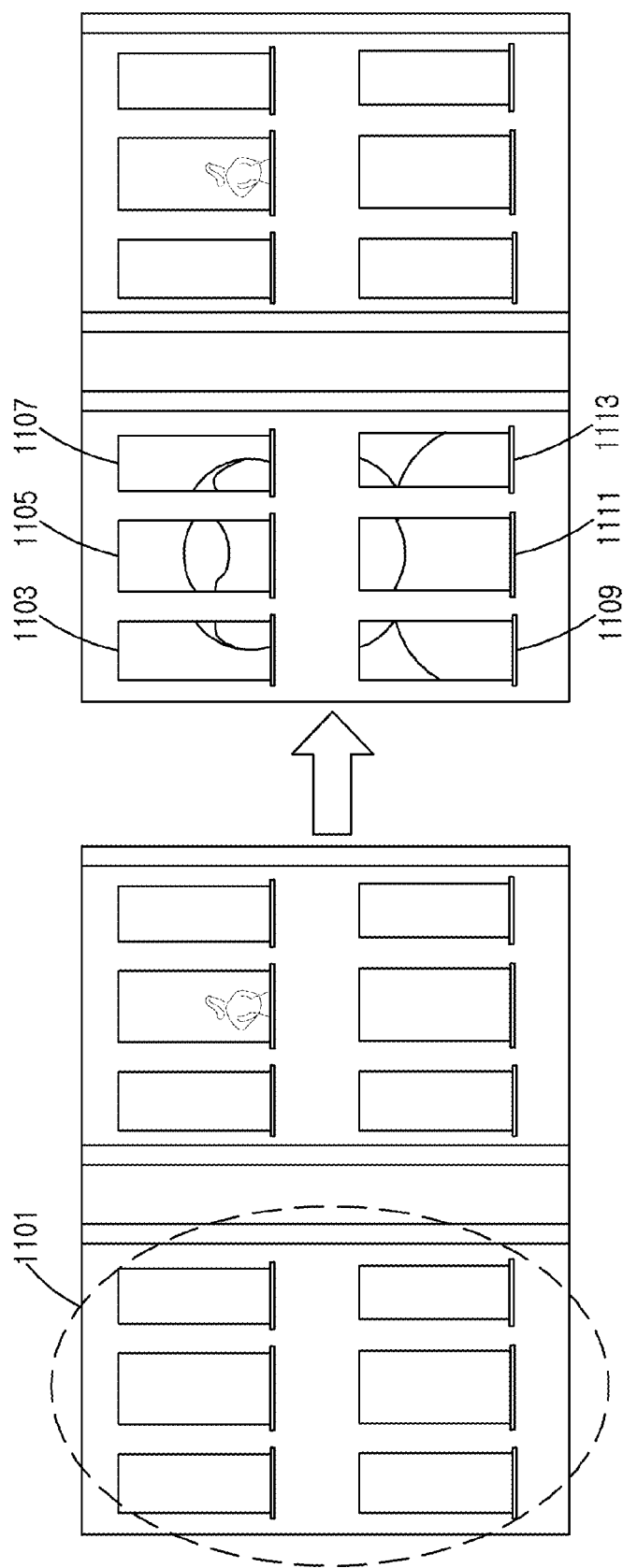

FIGS. 11A and 11B illustrate examples where first and second images are synthesized when two or more objects having an identical shape exist in a selected region in an electronic device according to another embodiment of the present disclosure. When an object including a plurality of rectangles exist in a selected region by a user.

Referring to FIG. 11A, the electronic device 200 may divide the second image into a plurality of images according to the number and size of the objects and respectively synthesize the divided images with the plurality of object regions in the first image. In addition, the electronic device 200 may determine warping values for the respective objects, deform each divided image based on each determined warping value, and synthesize the deformed images. When the number of the objects existing in the selected area is greater than a threshold number or a size of the objects is smaller than a threshold size, the electronic device 200 may pixelate the second image and synthesize the pixilated second image with the object region including the plurality of rectangles.

Referring to FIG. 11B, when a plurality of rectangular objects exist in a region 1101 selected by the user, the electronic device 200 may divide the second image into a plurality of images according to the number and size of the objects and respectively synthesize the divided images with the plurality of object regions in the first image. Here, the size of the divided images may correspond to a size and position of each of the objects 1103, 1105, 1107, 1109, 1111 and 1113.

Furthermore, the electronic device 200 may confirm an image effect existing in an object region of the first image before the image synthesis, and apply the same effect to the synthesis region.

Figure 12A:
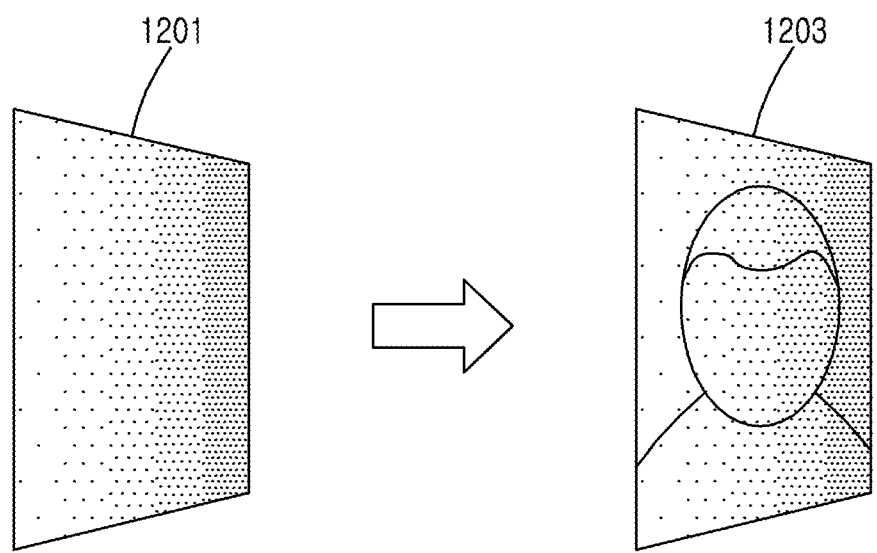
FIGS. 12A and 12B illustrate examples where, when first and second images are synthesized in an electronic device, an image effect existing in the first image before a synthesis is applied to the synthesized image according to an embodiment of the present disclosure.
Figure 12B:
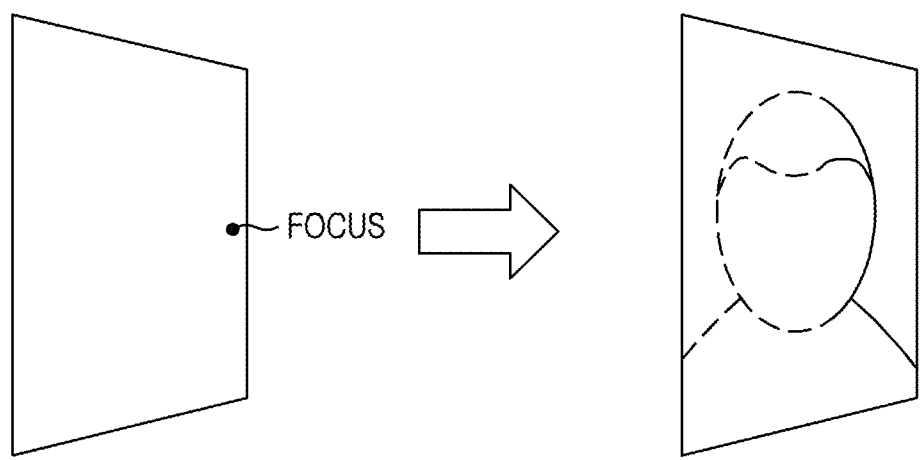

FIGS. 12A and 12B illustrate examples where an image effect existing in the first image before synthesizing an image is applied to a synthesized image, when the first and second images are synthesized in an electronic device according to an embodiment of the present disclosure.

Referring to FIG. 12A, the electronic device 200 may confirm brightness information of an object area 1201 in the first image, apply the same brightness information as the confirmed one to the second image, and synthesize the second image with the object region of the first image 1203.

Referring to FIG. 12B, the electronic device 200 confirms focus information of an object area in the first image, apply the same focus information as the confirmed one to the second image, and synthesize the second image with the object region of the first image. The image effect may include a graphic effect to be addable to the image, such as brightness, lightness, luminance, color, or focus.

Furthermore, when an object region is detected and an aspect ratio of the detected object region does not satisfy a preset condition, the electronic device 200 may cut the detected object region according to the size of the second image and perform synthesis.

Furthermore, when synthesizing images, the electronic device 200 may control brightness and sharpness of boundary of the synthesized image for minimizing a sense of difference of the synthesized image.

Various embodiments of the present disclosure and all of the functional operations described in this specification may be implemented in computer software, firmware, or hardware, including the structures disclosed in this specification and their structural equivalents, or in combinations of one or more of them. Various embodiments of the disclosure may be implemented as one or more computer program products, i.e., one or more modules of computer program instructions encoded on a computer readable medium for execution by, or to control the operation of, data processing apparatus.

The computer readable medium may be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

It will be appreciated that various embodiments of the present disclosure according to the claims and description in the specification may be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are various embodiments of machine-readable storage that are suitable for storing a program or programs comprising instructions that, when executed, implement various embodiments of the present disclosure.

Accordingly, various embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and various embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and equivalents.

What is claimed is:

1. A method in an electronic device, the method comprising:
    obtaining a first image from a first camera and a second image from a second camera, the first camera and the second camera being included in the electronic device, the first image and the second image being substantially simultaneously obtained;
    detecting an object region completely within the first image for synthesizing the second image into the first image;
    determining a warping value of the object region using a function representing a transformation in shape between the object region and the second image; and
    displaying the second image within the first image, the second image being deformed according to the warping value of the object region in the object region.

2. The control method of claim 1, wherein the warping value of the object region is determined based on at least one of an angle between the electronic device and the object region, a distance between a first camera and the object region, a size of the object region, and information about affine characteristics of the object region.

3. The control method of claim 1, further comprising:
    obtaining at least one of the first image and the second image from another electronic device.

4. The control method of claim 1, further comprising:
    obtaining at least one of the first image and the second image from another external device.

5. The control method of claim 1, further comprising:
    substantially simultaneously obtaining each of the first image and the second image in real time,
    wherein the synthesizing of the second image deformed according to the warping value with the object region comprises applying the warping value determined for an object region in the first image to the second image.

6. The control method of claim 1, wherein the detecting of the object region comprises:
    detecting at least one object corresponding to a pre-registered shape with the electronic device in the first image; and
    determining the at least one object region as an object region for synthesizing the second image.

7. The control method of claim 6, wherein the detecting of the object region comprises:
    sensing a selected region under a user's control in the first image;
    detecting at least one object region within a threshold distance from the selected region; and
    determining the at least one object region as an object region for synthesizing the second image.

8. The control method of claim 1, wherein the displaying of the second image comprises,
    applying, to the second image, an image effect applied to the object region in the first image; and
    synthesizing the second image to which the image effect is applied with the object region in the first image.

9. The control method of claim 8, wherein the image effect comprises at least one of brightness, lightness, luminance, color, and focus.

10. The control method of claim 1, wherein the detecting of the object region comprises determining a plurality of object regions having an identical shape in the first image as an object region for synthesizing the second image.

11. The control method of claim 10, wherein the displaying of the second image within the first image comprises:
    dividing, when a number of the plurality of object regions is smaller than a threshold number, the second image into a plurality of images based on the number and a size of the plurality of object regions; and
    displaying each of the plurality of images within one an object region of the plurality of object regions.

12. The control method of claim 10, wherein the displaying of the second image within the first image comprises:
    when the number of the plurality of object regions is greater than the threshold number, pixelating the second image; and
    synthesizing the pixilated second image with the plurality of object regions.

13. An electronic device comprising:
    a display;
    a plurality of cameras, including a first camera and a second camera; and
    at least one processor operatively coupled to the display, the processor configured to perform operations comprising:
        obtaining substantially simultaneously, a first image from the first camera and a second image from the second camera,
        detecting an object region completely within the first image for synthesizing the second image into the first image,
        determining a warping value of the object region using a function representing a transformation in shape between the object region and the second image, and
        displaying the second image within the first image, the second image being deformed according to the warping value of the object region in the object region.

14. The electronic device of claim 13, further comprising:
    a transceiver configured to communicate with another electronic device,
    wherein a third image is obtained from the other electronic device through the transceiver.

15. The electronic device of claim 13, further comprising a memory storing at least one image,
    wherein the processor obtains, from the memory, a third image, which is not obtained by the plurality of cameras.

16. A non-transitory computer readable medium having a program recorded thereon, when executed, causes at least one processor of an electronic device to perform the method of:
    obtaining substantially simultaneously, a first image from a first camera and a second image from a second camera the first camera and the second camera being included in the electronic device;

detecting an object region completely within the first image for synthesizing the second image into the first image;

determining a warping value of the object region using a function representing a transformation in shape between the object region and the second image; and displaying, with the object region, the second image within the first image, the second image being deformed according to the warping value of the object region.

* * * * *